(12) United States Patent
Araki et al.

(10) Patent No.: US 6,192,866 B1
(45) Date of Patent: Feb. 27, 2001

(54) DIAGNOSIS FOR DETECTING FREEZING CONDITION IN INTAKE PRESSURE SENSOR

(75) Inventors: Akihiko Araki; Masanobu Ohsaki; Michiyuki Fujimoto; Mitsuru Miyata, all of Gunma (JP)

(73) Assignee: Unisia Jecs Corporation, Atsugi (JP)

( * ) Notice: Subject to any disclaimer, the term of this patent is extended or adjusted under 35 U.S.C. 154(b) by 0 days.

(21) Appl. No.: 09/396,425

(22) Filed: Sep. 15, 1999

(30) Foreign Application Priority Data

Sep. 24, 1998 (JP) .................................................. 10-269916

(51) Int. Cl.[7] ............................ F02D 41/22; G01M 15/00
(52) U.S. Cl. .............................................. 123/479; 73/118.1
(58) Field of Search ........................ 123/339.15, 406.13, 123/479, 494, 690; 73/116, 117.2, 117.3, 118.1; 701/107, 114

(56) References Cited

U.S. PATENT DOCUMENTS

| | | | | |
|---|---|---|---|---|
| 5,349,936 | * | 9/1994 | Uchinami | 123/676 |
| 5,635,633 | * | 6/1997 | Kadota | 73/118.1 |
| 5,808,189 | * | 9/1998 | Toyoda | 73/118.2 |
| 6,035,835 | * | 3/2000 | Shigihama et al. | 73/117.3 X |

FOREIGN PATENT DOCUMENTS

| | | |
|---|---|---|
| 62-233447 | 10/1987 | (JP) . |
| 6-167236 | 6/1994 | (JP) . |

\* cited by examiner

*Primary Examiner*—Terry M. Argenbright
(74) *Attorney, Agent, or Firm*—Foley & Lardner

(57) ABSTRACT

A diagnostic system for detecting a freezing condition of an intake pressure sensor for an engine includes a control unit for checking engine operating parameters after a turn-on of an ignition switch to determining whether the engine is a predetermined state permitting a freeze diagnosis, and for performing the freeze diagnosis only when the engine is in the predetermined state. The control unit monitors a decrease of the intake pressure sensed by the intake pressure sensor as the engine speed increases from a start, and judges a freezing condition to exist if the intake pressure does not become sufficiently low even after the engine speed becomes higher than a predetermined speed level.

20 Claims, 4 Drawing Sheets

DIAGNOSIS FOR DETECTING FREEZING CONDITION IN INTAKE PRESSURE SENSOR

BACKGROUND OF THE INVENTION

The present invention relates to technique for detecting a freezing or icing condition of an intake pressure sensor.

The intake manifold pressure of an engine is often used as one of main input signals in fuel injection control systems such as a electronic fuel injection system of a D-Jetronic type. An intake pressure sensor is attached to an intake passage downstream of a throttle valve.

SUMMARY OF THE INVENTION

In cold weather, water droplets may freeze and disable an intake pressure sensor in an engine cold start operation. Such freezing condition can take place in a pressure introduction pipe for introducing an intake pressure to an intake pressure sensor, or a sensing section of an intake pressure sensor directly attached to an intake passage. The freezing condition can deprive the fuel injection system of the correct input information on the intake pressure needed to perform the normal fuel injection control.

It is therefore an object of the present invention to provide a diagnostic system or method for accurately detecting a freezing condition of an intake pressure sensor.

According to the present invention, a diagnostic apparatus for detecting a freezing condition of an intake pressure sensor for sensing a pressure in an intake passage of an internal combustion engine comprises discriminating means and diagnosing means. The discriminating means is for monitoring an engine operating condition in an engine starting operation to determine whether a predetermined requirement for permitting a freeze diagnosis is satisfied. The diagnosing means is for examining an output signal of the intake pressure sensor to detect the existence or nonexistence of the freezing condition of the intake pressure sensor when the predetermined requirement is satisfied.

DETAILED DESCRIPTION OF THE INVENTION

Figure 1:
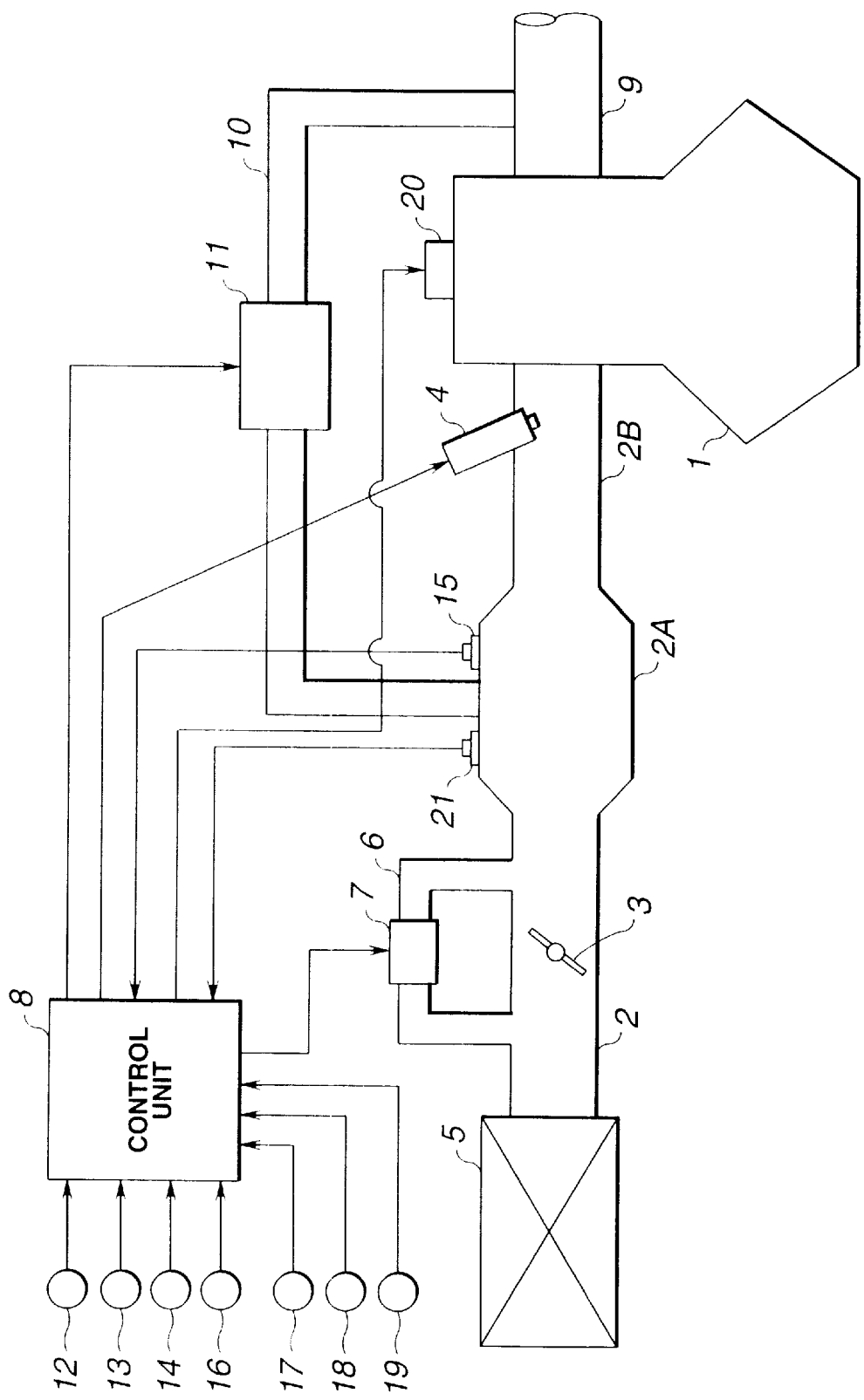
FIG. 1 is a schematic view showing an engine system according to one embodiment of the present invention.

FIG. 1 shows an engine system according to one embodiment of the present invention. The engine system of this example is a prime mover of a vehicle.

An intake pressure sensor 21 for sensing an intake air pressure is provided in an intake system for an internal combustion engine 1. A throttle valve 3 is disposed in an intake passage 2 of the engine 1. The intake passage 2 includes a collector section 2A on the downstream side of the throttle valve 3. The intake pressure sensor 21 of this example is disposed in the collector section 2A. In this embodiment, the intake pressure sensed by the intake pressure sensor 21 is used to control a fuel supply quantity to the engine 1.

For fuel injection to each cylinder, fuel injectors 4 are provided in branches 2B in a downstream manifold section of the intake passage 2, respectively. An air cleaner 5 is provided at an upstream end of the intake passage 2.

An auxiliary air passage 6 bypasses the throttle valve 3. An auxiliary air control valve 7 of a solenoid type is disposed in the auxiliary air passage 6, and arranged to vary its opening degree in response to an auxiliary air control signal produced by a diagnostic control unit 8 to perform a feedback control for reducing a deviation of an actual engine speed from a desired target speed during idling.

An EGR (exhaust gas recirculation) passage 10 extends from an exhaust gas passage 9 of the engine 1 to the downstream section of the intake passage 2 downstream of the throttle valve 3. An EGR valve 11 disposed in the EGR passage 10 varies an EGR quantity to reduce NOx in a predetermined engine operating region.

A group of sensors and other input devices collect input information on engine operating conditions and supply the input information to the diagnostic control unit 8.

A crank angle sensor 12 produces a position signal POS for signaling each predetermined crank angular displacement. The crank angle sensor 12 can serve as an engine speed sensor. An engine revolution speed Ne can be determined by counting pulses of the POS signal during a predetermined unit time interval. A cam angle sensor 13 responds to an angular motion of a camshaft of the engine, and produces a reference signal REF for each stroke phase difference of each cylinder and a signal used to discriminate among the engine cylinders. A temperature sensor 14 of this example senses the temperature Tw of an engine cooling water of the engine 1. An intake temperature sensor 15 is provided in the collector section 2A near the intake pressure sensor 21, and arranged to sense the temperature of the intake air. A throttle sensor 16 senses the opening degree of the throttle valve 3. An idle switch 17 is attached to the throttle sensor 16 and arranged to detect an engine idling condition. A neutral switch 18 turns on when the neutral position of a transmission is selected. A vehicle speed sensor 19 senses a vehicle speed VSP.

A spark plug 20 is provided for each cylinder of the engine 1. The control unit 8 delivers an ignition timing control signal to each spark plug 20 and controls the ignition timing (spark advance) ADVT.

Figure 2:
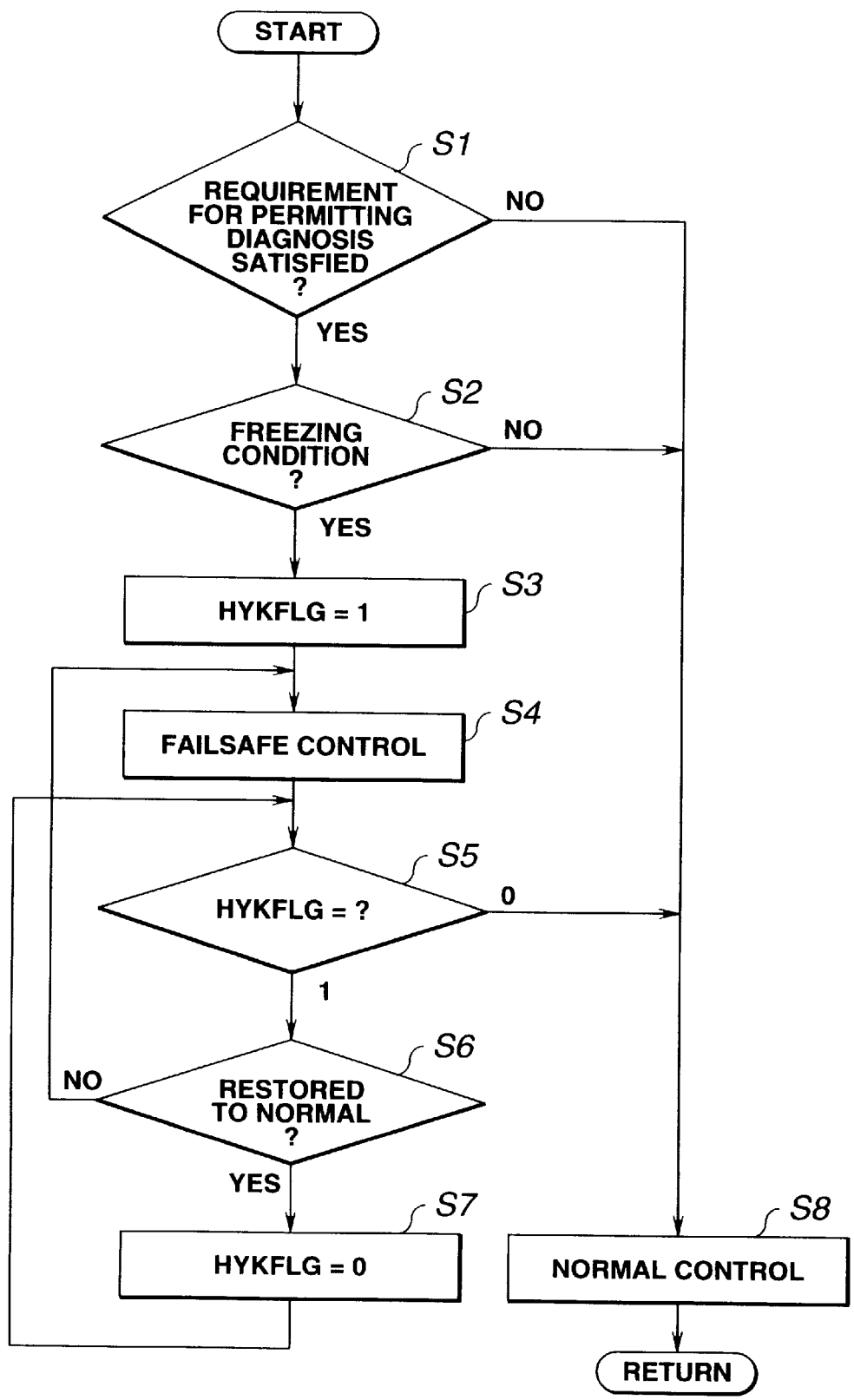
FIG. 2 is a flowchart of a freeze diagnosis and failsafe control process performed by a control unit shown in FIG. 1.

The control unit 8 further functions to detect a freezing or icing condition of the intake pressure sensor 21 and to perform a failsafe control when a freezing condition is detected, as shown in FIG. 2.

A step S1 is a step for determining whether a predetermined requirement for initiating a freeze diagnosis is satisfied or not. The step S1 corresponds to discriminating means for monitoring one or more engine operating conditions to determine whether a predetermined requirement for permitting the freeze diagnosis is satisfied, or whether the engine 1 is in a predetermined situation permitting the freeze diagnosis.

In this example, all of the following four conditions are required. First, the temperature TWINT of the engine cooling water sensed at a start of the engine by the temperature sensor 14 must be lower than a predetermined temperature HYKTW (=0° C. in this example), or the intake air temperature TAINT of the intake air sensed at a start of the engine by the intake air temperature sensor 15 must be lower than a predetermined temperature HYKTA (=0° C. for example). Second, the idle switch 17 must be ON. Third, the neutral switch 18 has experienced an on operation. Fourth, the crank angle sensor 12, the cam angle sensor 13, the intake air temperature sensor 15, the throttle sensor 16, the idle switch 17, the neutral switch 18 and the intake pressure sensor 21 are all diagnosed as normal by respective diagnostic operations. (This diagnosis of the intake pressure sensor 21 is an operation for detecting breakage of wire or disconnection. The diagnosis for detecting a freezing condition is excluded.) Thus, the diagnosis for the freezing condition is permitted only when all these four conditions are present. The third condition is required only for a vehicle equipped with an automatic transmission.

When the vehicle is held in a standstill state after a start of the engine, and thereafter the engine is restarted from the standstill state, the intake air temperature may be still below a freezing temperature and a freezing condition may exists. In such a situation, the first condition about the temperature is appropriate to permit the freeze diagnosis. During idling, a greater change is produced in the intake pressure sensed by the intake pressure sensor 21, so that the accuracy of the diagnosis can be high. Therefore, the diagnostic system of this example utilizes the idling state for the diagnosis with the above-mentioned second condition. The third condition is to continue the freeze diagnosis even when the automatic transmission is shifted to the D range just after an engine start in the neutral state. With the fourth condition, the diagnostic system prevents misdiagnosis and improve the diagnostic accuracy by performing the freeze diagnosis only when the sensors are functioning properly.

When the requirement of the step S1 is met, the control unit 8 proceeds to a step S2, and performs the freeze diagnosis in the following manner. In this example, the control unit 8 judges a freezing condition to be present when a deviation or difference DELTPB of a sensed current intake pressure (absolute pressure) PB from a sensed initial intake pressure PBINT remains lower than a predetermined absolute pressure slice level HANTPB for the freeze diagnosis from an ignition on operation until the engine speed increases and an engine speed condition higher than a predetermined engine speed HYKRPM continues for a predetermined time RPMOK. The sensed initial intake pressure PBINT is the intake pressure sensed when the ignition switch is turned on (OFF to ON). The sensed current intake pressure PB is determined periodically at a sampling period (1 ms, for example). The deviation DELTPB is the absolute value of a difference between PBINT and PB. DELTPB= ‖PBINT−PB‖

Figure 3:
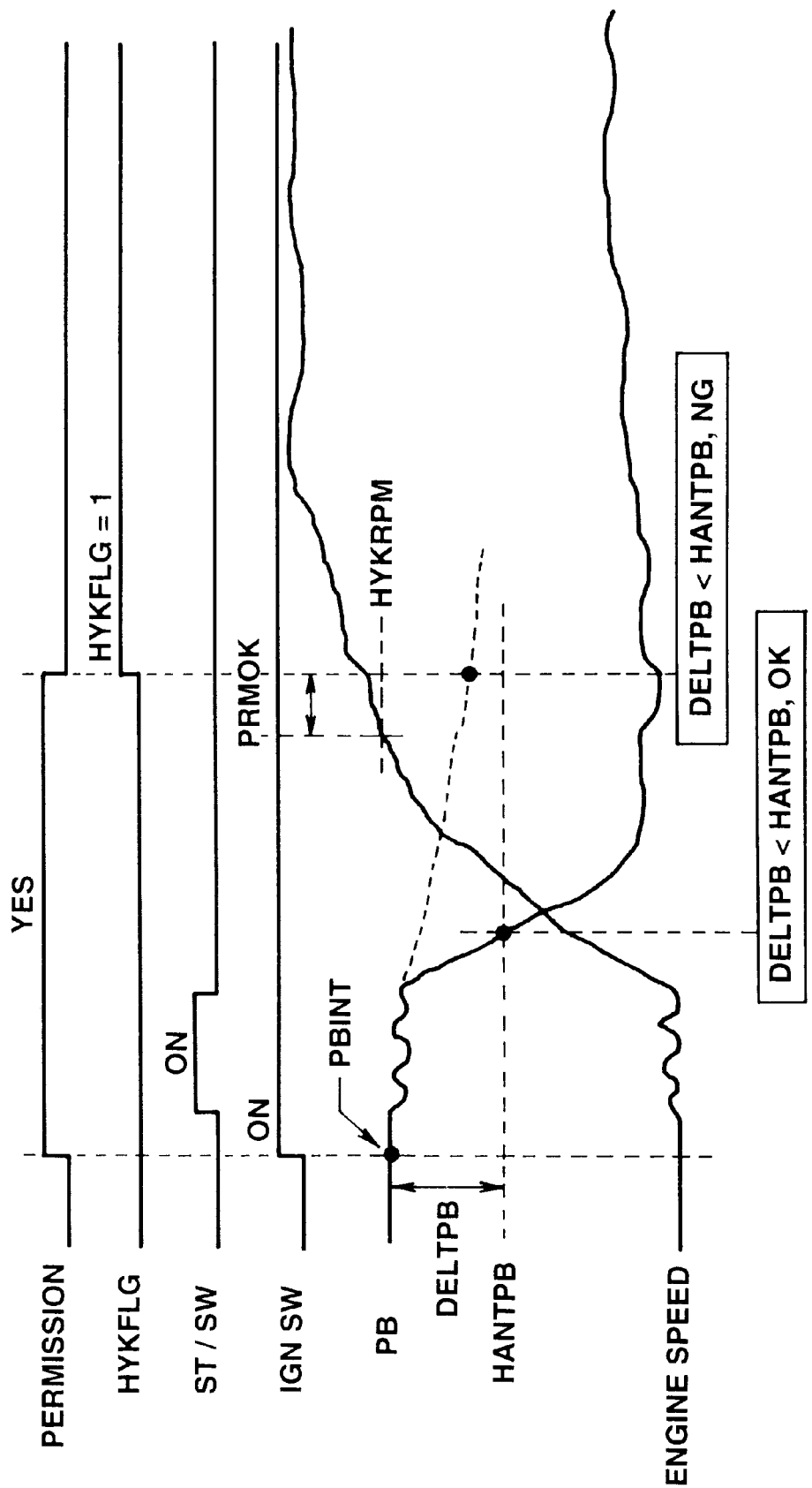
FIG. 3 is a time chart illustrating the freeze diagnosis according to the embodiment of the present invention.

The initial intake pressure PBINT sensed by the intake pressure sensor 21 at the time of a turn-on of the ignition switch is equal to the atmospheric pressure irrespective of whether a freezing condition is present or not. Thereafter, if the intake pressure sensor 21 is free of a freezing or icing condition, the intake pressure (absolute pressure) PB decreases as the engine speed Ne increases as shown by a solid line in FIG. 3, and hence the deviation DELTPB of the current intake pressure PB from the current intake pressure PBINT increases. If the intake pressure sensor 21 is in the freezing condition, the actual intake pressure is not readily transmitted, and the deviation between the sensed current intake pressure PB and the initial intake pressure PBINT cannot increase sufficiently as shown by a broken line in FIG. 3.

Therefore, the control unit 8 of this example judges the freezing condition to exist and the intake pressure sensor 21 to be iced if the deviation DELTPB continues to be lower than the slice level HANTPB (DELTPB<HANTPB) for a time interval equal to or longer than the predetermined time length RPMOK in the state in which the engine speed is equal to or higher than the predetermined speed HYKRPM.

When the intake pressure sensor 21 is judged to be iced, the control unit 8 proceeds from the step S2 to a step S3, and sets a freezing condition flag HYKFLG to one at the step S3.

Then, the control unit 8 proceeds from the step S3 to a step S4 to perform a failsafe control operation adapted to the freezing condition. In this example, the control unit 8 controls the air fuel ratio by setting the fuel injection quantity corresponding to the cylinder intake air quantity in accordance with the throttle valve opening degree α sensed by the throttle sensor 16 and the engine speed Ne sensed by the crank angle sensor 12. Thus, this control system can perform the minimum fail safe control operation even if the fuel injection quantity control based on the intake pressure is not feasible because of the freezing condition of the intake pressure sensor 21.

At a step S5 following the step S4, the control unit 8 checks the freezing condition flag HYKFLG, and proceeds to a step S6 when the freezing condition flag HYKFLG is one. At the step S6, the control unit 8 checks whether the freezing condition is removed and the intake pressure sensor 21 is restored to a normal condition. This restoration check of the step S6 is an inverse operation of the freezing condition check of the step S2. In this example, the control unit 8 judges that the intake pressure sensor 21 is restored to the normal condition if the deviation DELTPB between the current intake pressure PB and the initial intake pressure PBINT is equal to or greater than the absolute pressure slice level HANTPB. That is, DELTPB≧HANTPB.

When the intake pressure sensor 21 is not in the normal condition, the control unit 8 returns from the step S6 to the step S4 and continues the failsafe control operation. When the intake pressure sensor 21 is restored to the normal condition, the control unit 8 proceeds from the step S6 to a step S7, resets the freezing condition flag HYKFLG to zero at the step S7 and then returns to the step S5.

After the restoration to the normal condition, the control unit 8 proceeds from the step S5 to a step S8 and performs a normal fuel injection control (of D-Jetronic type) responsive to the intake pressure sensed by the intake pressure sensor 21. Thus, the control mode is changed from the fail safe mode to the normal control mode.

Thereafter, the control system does not perform this freezing condition diagnosis and the associated control operation until the ignition switch is turned off.

If one of the answers of the steps S1 and S2 is NO, the control unit 8 proceeds to the step S8 and performs the normal fuel injection control based on the intake pressure sensed by the intake pressure sensor 21.

This diagnostic system can detect a freezing condition of the intake pressure sensor 21 accurately, perform the fail safe control operation only during the presence of the freezing condition, and returns to the normal fuel injection control immediately after restoration to the non-freezing condition. The control mode is always adapted to the existing situation.

Figure 4:
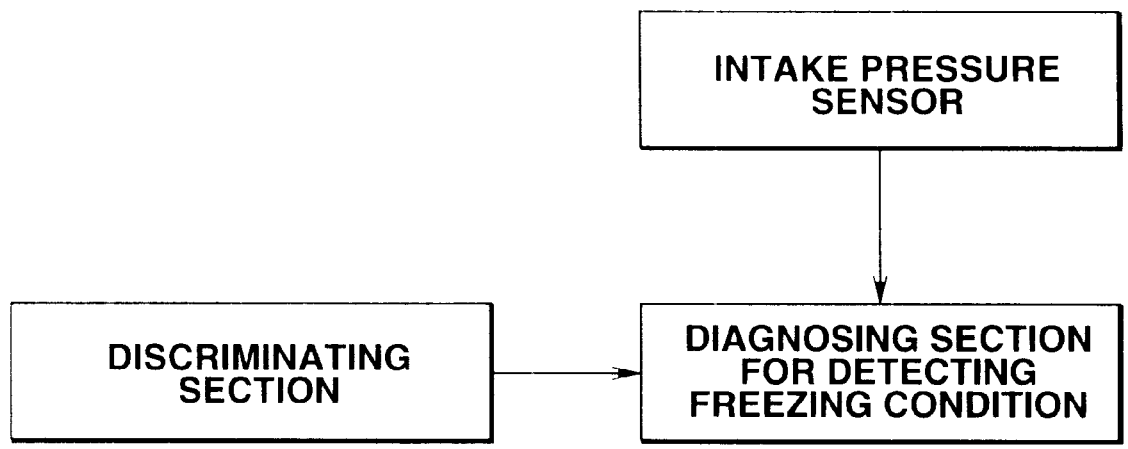
FIG. 4 is a block diagram showing an arrangement of elements appearing in the present invention.

FIG. 4 shows one arrangement of basic elements which can be employ in the present invention. A diagnosing apparatus for detecting a freezing condition of an intake pressure sensor shown in FIG. 4 includes at least a discriminating section and a diagnosing section. The discriminating section monitors one or more engine operating parameters during an engine starting operation, and determines whether the engine is in a predetermined state permitting a freeze diagnosis. When the engine is in the predetermined state, the diagnosing section examines a variation in an output signal of the intake pressure sensor, and detects the existence of the freezing condition in the intake pressure sensor in accordance with the variation of the sensed intake pressure.

The present application is based on a prior Japanese Patent Application No. 10(1998)-269916. The entire contents of the Japanese Patent Application No. 10(1998)-269916 with a filing date of Sep. 24, 1998 are hereby incorporated by reference.

The invention is not limited to the illustrated embodiment. Various modifications and variations of the embodiment are feasible for those skilled in the art in light of the above teachings.

What is claimed is:

1. A diagnostic apparatus for detecting a freezing condition of an intake pressure sensor for sensing a pressure in an intake passage of an internal combustion engine, the diagnostic apparatus comprising:

discriminating means for monitoring an engine operating condition at a start of the engine to determine whether a predetermined requirement for permitting a freeze diagnosis is satisfied; and diagnosing means for monitoring an initial intake pressure sensed by the intake pressure sensor at the start of the engine, and a current intake pressure sensed by the intake pressure sensor after the start of the engine, and for determining the existence or nonexistence of the freezing condition of the intake pressure sensor in accordance with a change of the current intake pressure from the initial intake pressure when the predetermined requirement is satisfied.

2. The diagnostic apparatus as recited in claim 1 wherein the diagnosing means determines the existence or nonexistence of the freezing condition of the intake pressure sensor by comparing a difference between the initial intake pressure and the current intake pressure with a predetermined pressure slice level.

3. The diagnostic apparatus as recited in claim 2 wherein the diagnosing means judges the freezing condition of the intake pressure to be present when the absolute value of the difference between the initial intake pressure and the current intake pressure is smaller than the predetermined pressure slice level.

4. The diagnostic apparatus as recited in claim 1 wherein the diagnosing means uses, for diagnosis of the intake pressure sensor, the current intake pressure sensed by the intake pressure sensor when an engine speed of the engine is equal to or higher than a predetermined speed.

5. The diagnostic apparatus as recited in claim 4 wherein the diagnosing means uses, for diagnosis of the freezing condition, the current intake pressure sensed by the intake pressure during a period from a first time point at which the engine speed becomes equal to or higher than the present speed to an end of a predetermined time interval from the first time point.

6. The diagnostic apparatus as recited in claim 1 wherein the diagnostic apparatus further comprises failsafe means for controlling the engine in a failsafe control mode by using an engine operating parameter other than the intake pressure sensed by the intake pressure sensor when the freezing condition of the intake pressure sensor is judged to exist by the diagnosing means.

7. The diagnostic apparatus as recited in claim 6 wherein the diagnostic apparatus further comprises restoration checking means for monitoring the intake pressure sensed by the intake pressure sensor during control in the failsafe control mode to determine whether the freezing condition of the intake pressure sensor is removed, and the intake pressure sensor is restored to a normal state; and mode changing means for changing an engine control mode from the failsafe control mode to a normal control mode based on the intake pressure sensed by the intake pressure sensor when the restoration checking means judges that the intake pressure sensor is restored to the normal state.

8. The diagnostic apparatus as recited in claim 7 wherein the restoration checking means judges the intake pressure sensor to be restored to the normal state when the absolute value of the difference between the initial intake pressure and the current intake pressure becomes greater than the predetermined pressure slice level.

9. The diagnostic apparatus as recited in claim 1 wherein the requirement for permitting the freeze diagnosis used by the discriminating means comprises a first condition that an engine temperature at an engine start is lower than a predetermined temperature.

10. The diagnostic apparatus as recited in claim 9 wherein the requirement for permitting the freeze diagnosis used by the discriminating means further comprises a second condition that the engine is in an idling state.

11. The diagnostic apparatus as recited in claim 1 wherein the initial intake pressure is an intake pressure sensed by the intake pressure sensor when an ignition switch for the engine is turned on.

12. An engine system comprising:

an internal combustion engine;

an input section for collecting input information on engine operating conditions of the engine, the input section including an intake pressure sensor for sensing an intake air pressure in an intake passage (2) for the engine; and a diagnostic control unit for producing a permission signal in a predetermined engine operating situation, and detecting a freezing condition of the intake pressure sensor by monitoring variation of the intake air pressure sensed by the intake pressure sensor when the permission signal is present.

13. An engine system as recited in claim 12 wherein the input section further includes an engine speed sensor for sensing an engine speed of the engine, and the diagnostic control unit detects the freezing condition of the intake pressure sensor by monitoring the variation of the intake pressure and the engine speed.

14. The engine system as recited in claim 13 wherein the input section further comprises a temperature sensor for sensing a temperature representing an engine temperature of the engine, and an input device for sensing an idling condition of the engine, and the diagnostic control unit produces the permission signal only when the temperature sensed by the temperature sensor is lower than a predetermined temperature and the engine is in the idling condition.

15. The engine system as recited in claim 14 wherein the temperature sensor senses one of the temperature of an engine coolant and the temperature of an intake air to the engine.

16. The engine system as recited in claim 14 wherein the diagnostic control unit monitors a decrease of the intake pressure sensed by the intake pressure sensor from an initial intake pressure, and judges there exists the freezing condition when the decrease of the intake pressure remains lower than a predetermined value while the engine speed is higher than or equal to a predetermined speed.

17. The engine system as recited in claim 13 wherein the engine system further comprises an output section for controlling the engine in one of a normal control mode based on an output signal of the intake pressure sensor and a failsafe control mode independent from the output signal of the intake pressure sensor, and the diagnostic control unit controls the engine with the output section in the normal control mode when the freezing condition is not detected in the intake pressure sensor and in the failsafe control mode when the freezing condition is detected.

18. The engine system as recited in claim 17 wherein the diagnostic control unit returns an engine control mode from the failsafe control mode to the normal control mode when the decrease of the intake pressure from the initial pressure becomes equal to or greater than the predetermined pressure level.

19. A diagnostic process for detecting a freezing condition of an intake pressure sensor for sensing a pressure in an intake passage of an internal combustion engine, the diagnostic process comprising:
  a condition discriminating step of examining whether the engine is in a predetermined operating situation in an engine starting operation; and
  a diagnostic step of examining a change in an output signal of the intake pressure sensor to detect the existence of the freezing condition of the intake pressure sensor when the engine is in the predetermined situation.

20. The diagnostic process as recited in claim 19 wherein the diagnosing step comprises an operation for determining an initial intake pressure sensed by the intake pressure sensor at a start of the engine, and a current intake pressure sensed by the intake pressure sensor after the start of the engine, and for determining the existence or nonexistence of the freezing condition of the intake pressure sensor in accordance with a change of the current intake pressure from the initial intake pressure when the engine is in the predetermined situation; and wherein the diagnostic process further comprises a failsafe controlling step of controlling the engine in a failsafe control mode without regard to the intake pressure sensed by the intake pressure sensor when the freezing condition of the intake pressure sensor is judged to exist, a restoration checking step of monitoring the intake pressure sensed by the intake pressure sensor during control in the failsafe control mode, and determining whether the intake pressure sensor is restored to a normal state freed from the freezing condition, and a mode changing step of changing an engine control mode from the failsafe control mode to a normal control mode responsive to the intake pressure sensed by the intake pressure sensor when the intake pressure sensor is restored to the normal state.

* * * * *